United States Patent [19]

Klinkenberg

[11] Patent Number: 4,981,459
[45] Date of Patent: Jan. 1, 1991

[54] ANTI-LOCK BALL SPLINE ASSEMBLY

[75] Inventor: Hubert E. Klinkenberg, Rochester Hills, Mich.

[73] Assignee: Dana Corporation, Toledo, Ohio

[21] Appl. No.: 358,705

[22] Filed: May 30, 1989

[51] Int. Cl.$^5$ .............................................. F16D 3/06
[52] U.S. Cl. .................................................. 464/167
[58] Field of Search .......................... 384/18, 21, 49; 403/109, 359, 360; 464/162, 167, 168

[56] References Cited

U.S. PATENT DOCUMENTS 1,536,986  5/1925  Thiemer ..................... 464/162 X
3,365,914  1/1968  Asher .............................. 464/167

FOREIGN PATENT DOCUMENTS 1373753  8/1964  France ............................. 464/167
193933  11/1983  Japan ............................... 464/167
948539   2/1964  United Kingdom .

Primary Examiner—Daniel P. Stodola
Attorney, Agent, or Firm—Leydig, Voit & Mayer

[57] ABSTRACT

A ball spline assembly in which a sleeve is coupled for rotation with and axial movement relative to a shaft by angularly spaced rows of balls which travel in grooved raceways formed in the sleeve and the shaft. A circumferentially extending groove is formed around the shaft near the ends of the raceways therein in order to remove runout from the raceways and thereby prevent the raceways from forcing the balls radially outwardly and locking up the assembly when the shaft is in an extreme axial position relative to the sleeve.

3 Claims, 1 Drawing Sheet

ANTI-LOCK BALL SPLINE ASSEMBLY

BACKGROUND OF THE INVENTION

This invention relates to a ball spline assembly of the type in which angularly spaced rows of balls transmit torque between a splined shaft and an outer sleeve while reducing friction during relative axial movement of the shaft and the sleeve.

In a ball spline assembly of this type, the bore of the sleeve is formed with angularly spaced and axially extending grooves or raceways which receive the rows of balls. The shaft also includes ball-receiving grooves or raceways which are located between angularly spaced splines. The splines may be formed by moving a grinding wheel along a section of the length of the shaft in order to cut the raceways in the shaft. Near the end of the splined section, runout occurs where the grinding wheel makes less than a full depth cut as the wheel is retracted from the shaft. In the runout area, the depth of each raceway gradually decreases as the raceway progresses axially toward the non-splined section of the shaft.

A conventional ball spline assembly experiences problems when the shaft and the sleeve are at such an extreme relative axial position as to cause the balls to travel into the runout area of the shaft. As the balls encounter the shallow portions of the raceways in the runout area, the balls are forced radially outwardly until all radial clearance is removed from between the shaft, the balls and the sleeve. The resulting radial pressure can damage the components and can cause the assembly to lock.

SUMMARY OF THE INVENTION

The general aim of the present invention is to provide a new and improved ball spline assembly which eliminates the danger of radial pressure and lock-up when the shaft and the sleeve are at extreme relative axial positions.

A more detailed object of the invention is to achieve the foregoing by eliminating the runout area on the splined section of the shaft and thereby enable the balls to reach an extreme axial position along the shaft without being subjected to radial pressure.

The invention also resides in the elimination of the runout area through the provision of an annular groove which extends circumferentially around the shaft near the ends of the spline and which accommodates the end balls in the rows when the balls are in an extreme axial position along the shaft.

These and other objects and advantages of the invention will become more apparent from the following detailed description when taken in conjunction with the accompanying drawings.

DETAILED DESCRIPTION OF THE PREFERRED EMBODIMENT

Figure 1:
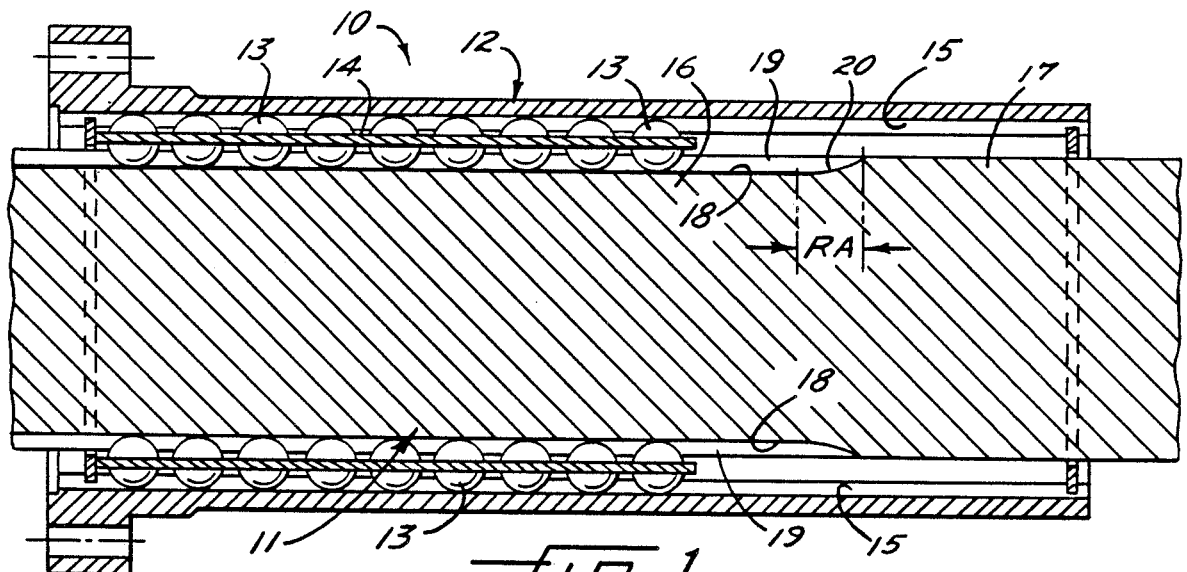
FIG. 1 is a cross-sectional view taken axially through a conventional prior art ball spline assembly of the type upon which the present invention improves.

In order to best explain the present invention, reference is first made to a ball spline assembly 10 (FIG. 1) as conventionally exists in the prior art. Basically, such an assembly includes an inner shaft 11, an outer sleeve 12 telescoped over the shaft, angularly spaced rows of anti-friction balls 13 interposed between the shaft and the sleeve, and a cage 14 for retaining the balls. The balls transmit torque between the shaft and the sleeve and reduce friction during relative axial movement of the shaft and the sleeve. In the present instance, the sleeve is fixed in an axially stationary position while the shaft translates axially within the sleeve.

More specifically, the bore of the sleeve 12 of the prior art spline assembly 10 is formed with several angularly spaced and axially extending grooves or raceways 15 which receive the balls 13. The shaft 11 is formed with a splined section 16 and by an axially adjacent smooth or non-splined section 17. The splined section 16 is formed with several angularly spaced and axially extending grooves or raceways 18 which are alined angularly with the raceways 15 to receive the balls 13. Splines 19 are defined by the sides of the raceways 18 and engage the balls to transmit torque between the shaft and the sleeve. The bottoms of the raceways 18 are concavely radiused in order to accommodate the balls.

Typically, the raceways 18 and the splines 19 are formed by translating a rotating grinding wheel (not shown) axially of the shaft 11 to cut the raceways. As the grinding wheel approaches the non-splined section 17 of the shaft, it is retracted away from the shaft. As a result of such retraction, the raceways 18 are left with a runout area RA adjacent the non-splined section of the shaft. In the runout area, the depth of the raceways 18 progressively decreases as the raceways approach the non-splined section 17. Thus, the bottom 20 of each raceway 18 is shaped as a curved surface in the runout area.

A problem is encountered when the shaft 11 translates to an extreme axial position relative to the sleeve 12 and the end balls 13 in the rows encounter the curved bottoms 20 of the raceways 18 in the runout area RA. As the end balls move into the runout area, they are cammed radially outwardly by the curved bottoms 20 of the raceways 18. As a result, radial clearance between the raceways 18, the balls 13 and the raceways 15 is removed and radial pressure is exerted on the components. The force resulting therefrom can damage the components (and particularly the sleeve 12) and, in some instances, can lock the shaft and sleeve against relative axial movement.

Figure 2:
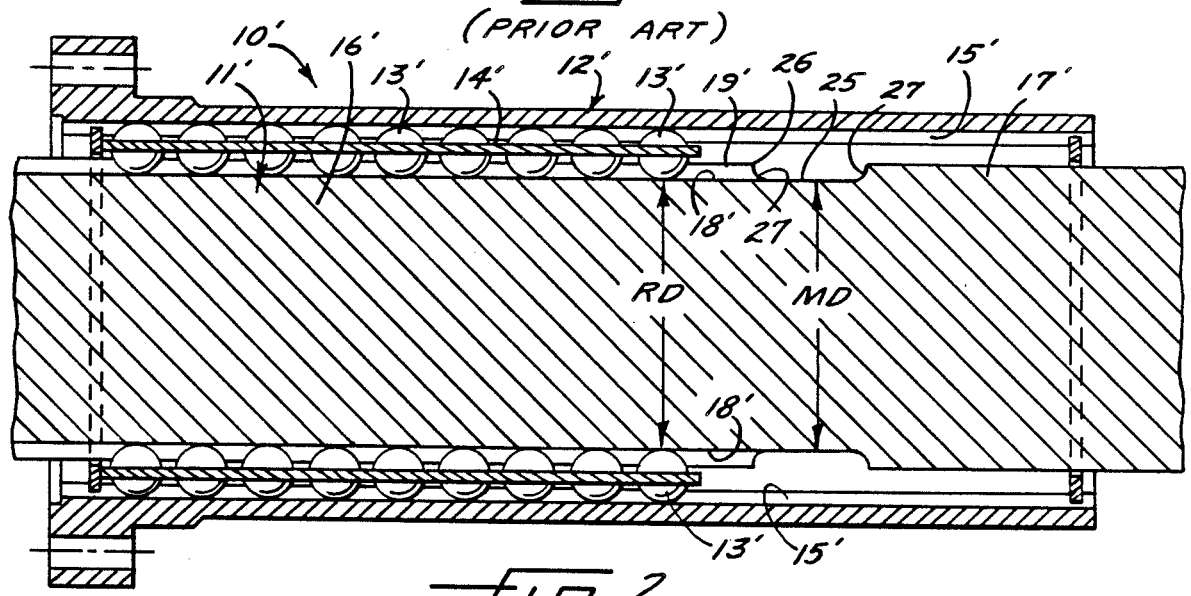
FIG. 2 is a view similar to FIG. 1 but shows a new and improved ball spline assembly incorporating the unique features of the present invention.
Figure 3:
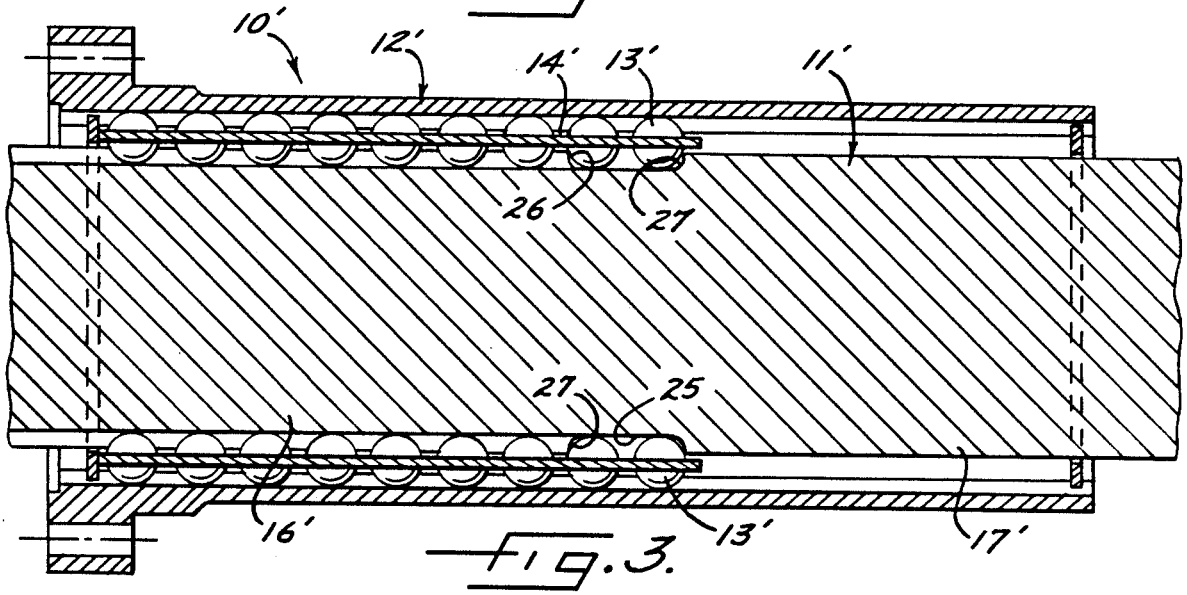
FIG. 3 is a view similar to FIG. 2 but shows the shaft and the balls moved to an extreme axial position relative to the sleeve.

The spline assembly of the invention has been shown in FIGS. 2 and 3 in which parts corresponding to those of the prior art assembly of FIG. 1 have been indicated by the same but primed reference numerals. In accordance with the present invention, the problem created by the runout area RA is eliminated by removing the runout area. This is achieved quite simply by cutting a circumferentially extending groove 25 (FIG. 2) around the shaft 11 at the junction of the splined section 16' and the non-splined section 17'.

As shown in FIG. 2, the minor diameter MD of the groove 25 is no greater than and is preferably equal to the root diameter RD of the raceways 18'. Thus, the depth of the groove 25 is equal to the depth of the raceways 18'. The right end portion of the groove 25 is positioned such that, when the groove is cut, the curved bottoms left at the ends of the raceways 18' are completely cut away. The length of the groove 25 is preferably equal to the axial span occupied by two adjacent balls 13' in the cage 14'.

The groove 25 opens radially outwardly and is continuous around the entire circumference of the shaft 11'. As a result of the groove 25, the end portions of the splines 19' are cut away and thus the splines are left with distinct ends 26 (FIG. 2). The bottom of the groove 25 is shaped as a cylindrical surface along the major length of the groove while the ends of the groove are sharply radiused as indicated at 27. The groove 25 may be formed either by a grinding wheel rotatable about an axis extending parallel to that of the shaft or may be formed by a suitable lathe tool.

FIG. 3 shows the components when the shaft 11' has translated to an extreme axial position relative to the sleeve 12'. As illustrated, the two endmost balls 13' in each row enter the groove 25 and the end balls simply contact the sharply radiused right end 27 of the groove. Since the balls in the groove are not subjected to any radially outward camming action, the balls neither damage the sleeve nor cause the sleeve to lock axially to the shaft. With the minor diameter MD of the groove 25 being equal to the root diameter RD of the raceways 18', the balls 13 are maintained in the raceways 15' of the sleeve 12' and in proper relation with the cage 14.

I claim:

1. A ball spline assembly comprising a shaft having a splined section and a non-splined section, said splined section being formed with a series of angularly spaced and axially extending splines, there being an axially extending raceway of predetermined depth located between each pair of adjacent splines, a sleeve telescoped over said shaft and having angularly spaced and axially extending raceways aligned angularly with the raceways of said shaft, and a row of generally spherical balls located in each pair of angularly aligned raceways to transmit torque between said shaft and said sleeve while reducing friction during relative axial movement of said shaft and said sleeve, said ball spline assembly being characterized by a radially outwardly opening groove extending circumferentially and continuously around said shaft between said splined section and said non-splined section, said groove having sharply radiused ends and a depth at least as great as the depth of the raceways in said shaft and having a bottom adapted to accommodate and contact at least a portion of the end ball in each row when said shaft is in an extreme axial position relative to said sleeve, whereby camming of said balls against said sleeve is substantially prevented.

2. A ball spline assembly as defined in claim 1 in which the axial length of said groove is sufficiently great to accommodate two balls of each row.

3. A ball spline assembly comprising a shaft having a splined section and a non-splined section, said splined section being formed with a series of angularly spaced and axially extending splines having ends proximate to the non-splined section, there being an axially extending raceway of predetermined depth located between each pair of adjacent splines, a sleeve telescoped over said shaft and having a bore formed with angularly spaced and axially extending raceways aligned angularly with the raceways of said shaft, and a row of generally spherical balls located in each pair of angularly aligned raceways to transmit torque between said shaft and said sleeve while reducing friction during relative axial movement of said shaft and said sleeve, said ball spline assembly including run-out area means for substantially preventing camming of the balls against the sleeve, said means being characterized in the provision of a radially outwardly opening and circumferentially continuous groove having sharply radiused ends extending circumferentially around said shaft adjacent the ends of said splines, said groove having a depth at least as great as the depth of the raceways in said shaft and having a bottom receiving and contacting at least a portion of the end ball in each row when said shaft is in an extreme axial position relative to said sleeve, the groove being axially elongated and the bottom of the groove defining a cylindrical surface which extends along a substantial length of the groove.

* * * * *